United States Patent
Morvan et al.

(10) Patent No.: US 8,985,206 B2
(45) Date of Patent: Mar. 24, 2015

(54) ENHANCED FOAM STABILITY APPLICATIONS AND METHODS

(75) Inventors: Mikel Morvan, Pessac (FR); Max Chabert, Bordeaux (FR); Manilal S. Dahanayake, Princeton Junction, NJ (US)

(73) Assignee: Rhodia Operations, Aubervilliers (FR)

(*) Notice: Subject to any disclaimer, the term of this patent is extended or adjusted under 35 U.S.C. 154(b) by 138 days.

(21) Appl. No.: 13/469,282

(22) Filed: May 11, 2012

(65) Prior Publication Data

US 2012/0285694 A1 Nov. 15, 2012

Related U.S. Application Data

(60) Provisional application No. 61/518,904, filed on May 13, 2011.

(51) Int. Cl.
*E21B 43/00* (2006.01)
*C09K 8/584* (2006.01)
*C09K 8/588* (2006.01)
*C09K 8/594* (2006.01)

(52) U.S. Cl.
CPC ............. *C09K 8/584* (2013.01); *C09K 8/588* (2013.01); *C09K 8/594* (2013.01)
USPC ........ 166/270; 166/270.1; 166/401; 166/309; 166/305.1

(58) Field of Classification Search
USPC ............. 166/270, 270.1, 401, 402, 403, 309, 166/305.1
See application file for complete search history.

(56) References Cited

U.S. PATENT DOCUMENTS

| | | | |
|---|---|---|---|
| 2,623,596 A | 12/1952 | Whorton et al. | |
| 2,792,894 A | 5/1957 | Graham et al. | |
| 2,866,507 A | 12/1958 | Bond et al. | |
| 3,185,634 A | 5/1965 | Craig, Jr. et al. | |
| 4,364,431 A | 12/1982 | Saidi et al. | |
| 4,706,752 A | 11/1987 | Holm | |
| 4,842,065 A | 6/1989 | McClure | |
| 4,852,653 A | 8/1989 | Borchardt | |
| 5,076,357 A | 12/1991 | Marquis | |
| 5,203,411 A | 4/1993 | Dawe et al. | |
| 5,247,993 A | 9/1993 | Sarem et al. | |
| 5,363,915 A | 11/1994 | Marquis et al. | |
| 5,614,473 A | 3/1997 | Dino et al. | |
| 5,952,285 A * | 9/1999 | Hawkins ........................ | 510/405 |
| 6,831,108 B2 | 12/2004 | Dahanayake et al. | |
| 7,134,497 B1 | 11/2006 | Chatterji et al. | |
| 7,461,694 B2 | 12/2008 | Dahanayake et al. | |
| 2003/0168217 A1 * | 9/2003 | Zhang et al. ................... | 166/308 |
| 2007/0215347 A1 | 9/2007 | Tang | |
| 2009/0111716 A1 | 4/2009 | Hough et al. | |
| 2009/0131283 A1 * | 5/2009 | Nguyen et al. ................. | 507/243 |
| 2012/0285694 A1 | 11/2012 | Morvan et al. | |

FOREIGN PATENT DOCUMENTS

| | | |
|---|---|---|
| MX | WO2010068082 A1 | 6/2010 |
| WO | WO8912158 A1 | 12/1989 |
| WO | WO2007058813 A2 | 5/2007 |

OTHER PUBLICATIONS

William W. Weiss, et al, "Artificial Intelligence Used to Evaluate 23 Single-Well Surfactant-Soak Treatments", SPE Reservoir Evaluation & Engineering, Jun. 2006, pp. 209-216.
Lin Zhao, et al, "Development and Evaluation of Foaming Agents for High Salinity Tolerance", Journal of Petroleum Science and Engineering 81 (2012) pp. 18-23.
A. H. Falls, et al, "Development of a Mechanistic Foam Simulator: The Population Balance and Generation by Snap-Off", SPE Reservoir Engineering, Aug. 1988, pp. 884-892.
Tor Austad, et al, "Spontaneous Imbibition of Water into Oil-Wet Carbonates", Journal of Petroleum Science & Engineering 39 (2003) pp. 363-376.
George Hirasaki, et al, "Surface Chemistry of Oil Recovery from Fractured, Oil-Wet, Carbonate Formations", Jun. 2004 SPE Journal, pp. 151-162.

* cited by examiner

*Primary Examiner* — Zakiya W Bates
*Assistant Examiner* — Silvana Runyan

(57) ABSTRACT

A method for enhancing foam stability in foaming compositions for use in oilfield treatment application, including but not limited to use in mobility control for gas flooding. The method comprises the step of adding to a foaming composition a foam stabilizer of formula (I):

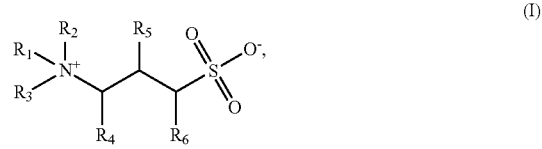

(I)

wherein $R_1$ is an alkylamido group or a branched or linear alkyl group; $R_2$ and $R_3$ are individually hydrogen or a methyl group; $R_4$, $R_5$ and $R_6$ are individually hydrogen or a hydroxy group, with the proviso that at least one of $R_4$, $R_5$ or $R_6$ is a hydroxyl group; wherein the alkyl group has greater than about 10 carbon atoms. Also disclosed are methods to enhance foam stability in an aqueous foaming composition.

22 Claims, No Drawings

ENHANCED FOAM STABILITY APPLICATIONS AND METHODS

CROSS-REFERENCE TO RELATED APPLICATION

This application claims the benefit of U.S. Provisional Application Ser. No. 61/518,904 filed May 13, 2011, herein incorporated by reference.

FIELD OF INVENTION

This invention relates to use of foam stabilizers in aqueous systems and, more particularly, use of foam stabilizers in enhancing mobility control during oil recovery operations.

BACKGROUND OF THE INVENTION

Fractured reservoirs containing oil generally consist of two distinct elements: a fracture network and a matrix (for example, a micro porous matrix). The fracture network is a series of interconnected cracks that can transmit fluids easily (very high permeability), but make up only a small fraction of the total porosity. The matrix portion consists of the oil-bearing porous rock that typically exhibits much lower permeability than the fracture network but has the bulk of the total porosity of the reservoir. Hydrocarbon production is normally less efficient in fractured reservoirs. During primary production, the natural reservoir pressures to produce the oil in place quickly decreases, leaving roughly more than 90% of the original oil still left in place, trapped in mostly the matrix (including, for example, micro porous network). Similarly, conventional methods of secondary recovery fail to displace substantial volumes of "left-in-place" oil.

Conventional waterflooding techniques exhibit relatively low efficiency in highly fractured reservoirs. Waterflooding in these reservoirs is characterized by early water breakthrough and rapidly increasing water-oil ratios to an uneconomic level. The injected water tends to travel only through the fractures and not interact with the oil trapped in rock matrix (e.g., micro porous). The injected water cannot penetrate into the matrix and thereby displace and recover oil trapped in the porous matrix. The injected water tends to recover only the oil left behind in the fracture system following primary production. The limited or nonexistent interaction of the injected water with the oil trapped in the matrix is caused also in part by the matrix portion not being water-wet. The matrix will not spontaneously imbibe or take in water. This is largely due to the mobility-tendency of water into high permeability zones and not the low permeability zones (that has most of the oil trapped).

One approach to increase the penetration of a water phase with the oil trapped matrix zones has been to add a surfactant to the water to modify the wettability of the carbonate from oil wet to water wet. Previous research and field experience has demonstrated that including a low concentration of the properly selected surfactant to the water will reduce the interfacial tension and also create now a water-wet condition in the area near the fracture face. With this altered condition, the aqueous phase then penetrates some distance into the porous matrix and thereby pushes out some of the oil that was within the pore spaces. In this countercurrent imbibition process, the oil that is displaced from the matrix then moves into the fracture system. Once pushed into the fracture system, the oil can be moved easily to a production well. In a countercurrent imbibition process, with or without the addition of a water-wetting surfactant, the rate of oil recovery is dependent upon the capillary pressure characteristics of the porous rock matrix. That is, the imbibition process is essentially unaffected by conventional techniques for controlling field operations, such as selecting pressures and flow rates.

Techniques for using surfactants in oil recovery in carbonate formation are disclosed by G. Hirasaki and D. L. Zhang in "Surface Chemistry of Oil Recovery from Fractured, Oil-Wet Carbonate Formations" (2000); by Austad and Standes in "Spontaneous Imbibition of Water into Oil-Wet Carbonates", Journal of Petroleum Science and Engineering, vol. 39, pp. 363-376, (2003); by W. W. Weiss in "Artificial Intelligence Used to Evaluate 23 Single-Well Surfactant Soak Treatments", SPE Reservoir Evaluation & Engineering, June 2006; U.S. Pat. Nos. 2,792,894; 4,364,431; 4,842,065; 5,247,993; and U.S. Published Patent Application No. 2007/0215347 A1.

Another approach is to use gas flooding techniques such air, CO2, natural gas flooding, or any combination thereof, which is a form of enhanced oil recovery (EOR). Generally, CO2 EOR is where CO2 gas is pumped/injected into an injection or production well to an underground formation (e.g., fracturing reservoir) and, under certain physical conditions, miscibly mixes with trapped or left-in-place oil. This allows the left-in-place oil to become more easily displaced into the high permeability zones and recovered. The CO2, at high pressure and reservoir temperature, miscibly mixes with the oil to form a low viscosity fluid that can be more easily mobilized. Additionally, $CO_2$ has the capability of invading zones not previously invaded by water, as well as releasing and reducing trapped oil. The mixed residual oil and gas can also be displaced by a chase phase, for example, with water in a WAG (Water Alternating Gas) process.

Nitrogen and flue gas flooding (non-hydrocarbon gasses) can likewise be utilized. Nitrogen, however, has a low viscosity, poor miscibility with oil, and requires a much higher pressure to generate or develop miscibility as compared with $CO_2$ flooding. As such, nitrogen and flue gas flooding are generally utilized as a "chase gas" in hydrocarbon-miscible and $CO_2$ gas flooding (i.e., nitrogen or other low-cost gasses being used to provide a gas drive whereby a significant portion of the reservoir volume is filled with such gasses). However, while nitrogen can be used as a chase gas, it is understood that nitrogen and/or flue gas can be utilized in any gas flooding technique described herein.

As explained above, a fractured reservoir is extremely heterogeneous and has zones of high permeability in close proximity to zones of low permeability. Thus, CO2 and similar gas flooding techniques—analogous to some water flooding techniques—suffer from the tendency of the injected gas sweeping oil from only a limited area of the reservoir, i.e., from zones of high permeability. This occurs in part because the viscosity of CO2 at reservoir conditions is much lower than that of most oils, which will limit the sweep efficiency of the displacement and, therefore, oil recovery Thus, an approach to increase the penetration of a gas within the matrix blocks containing trapped oil has been to inject foam under pressure into the oil-bearing formation. The foam is generally formed by aeration of a mixture of surfactant and water. The foams having high apparent and increased viscosity will reduce the mobility of the water/surfactant solutions into the large fractures or high permeability zones effectively closing them off and/or providing a barrier to entry. With the altered condition, a subsequently introduced gas (such as CO2, natural gas) is diverted and/or able to penetrate into the low permeability porous matrix. In some particular embodiments, the reservoir is not a fractured reservoir, but an oil-bearing reservoir having naturally occurring zones of high permeability and naturally occurring low zones of permeability.

A problem with the use of foams in gas mobility control, however, is the inherently short life of the foams. For example, in oilfield applications, the foams dissipate relatively quickly diminishing the effectiveness in blocking the high permeable large fractures and any enhancement in oil recovery. It would be desirable to have a method for enhancing the stability of foam in aqueous applications such as in oilfield applications.

SUMMARY OF THE INVENTION

It has been discovered that the use of the foam stabilizers and/or surfactants described herein significantly improve the performance in oilfield treatment fluids or applications, in particular, mobility control in gas flooding.

The problem of foam stability in some cases has been addressed by the use of both synthetic and natural polymers; but the use of such polymers face drawbacks. For example, due to their high molecular weights, these polymers are difficult to formulate into surfactant formulations. The polymers' poor hydration and dispersibility, the incompatibility of such polymers (for example, cationic polymers) with frequently-used anionic surfactants, and high sensitivity to concentration versus performance in foaming, contributes to difficulty in using these polymers as additives in enhancing foaming in aqueous foamed solutions. Even when ideally formulated these polymers are still limited by the foam expansion due mostly to their poor diffusion rates to the interfaces creating the foam.

In one aspect, described herein is a method for enhancing recovery of oil from an oil-bearing formation within a reservoir, comprising: (a) introducing a foaming composition under pressure into the oil-bearing formation; (b) introducing a gas under pressure into the oil-bearing formation, wherein the presence of the foaming composition affects the flow of gas within the oil-bearing formation and/or at least partially diverts the flow of gas within the oil-bearing formation, and (c) extracting oil through a wellbore into the reservoir. The foaming composition can comprise a foam stabilizer. The foam stabilizer can be alkyl dimethyl betaine, alkyl amidopropyl hydroxy sulfobetaine or alkyl hydroxy sulfobetaine or any combination thereof, wherein the alkyl group has greater than 10 carbon atoms, or 12 carbon atoms, or 14 carbon atoms or in another embodiment, 16 carbon atoms. In other embodiments, the foaming composition can optionally comprise a foaming gas. In other embodiments, the foaming composition can comprise water. In other embodiments, the foaming composition can comprise any one or a combination selected from a foaming gas, water or one or more surfactants or additional surfactants. In some embodiments, the components of the foaming composition are mixed prior to being introduced into the reservoir or oil-forming formation. In other embodiments, one or more components of the foaming composition are injected into the oil-bearing formation at different times (e.g., sequentially) and thus become mixed down-hole.

In another aspect, described herein are methods for enhancing recovery of oil from an oil-bearing formation within a reservoir, comprising: (a) introducing a foaming composition under pressure into the oil-bearing formation; (b) introducing a gas under pressure into the oil-bearing formation, wherein the presence of the foaming composition affects the flow of gas within the oil-bearing formation and (c) extracting oil through a wellbore into the reservoir, wherein the foaming composition comprises a foam stabilizer having formula (I):

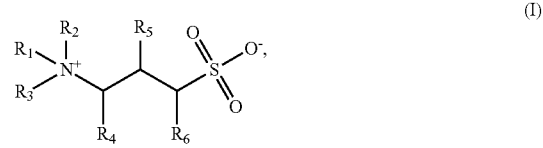

wherein $R_1$ is an alkylamido group or a linear or branched alkyl group; $R_2$ and $R_3$ are individually hydrogen, a methyl group or a hydroxyethyl group; $R_4$, $R_5$ and $R_6$ are individually hydrogen or a hydroxy group, with the proviso that at least one of $R_4$, $R_5$ or $R_6$ is a hydroxyl group, wherein the alkyl group has greater than about 10 carbon atoms. In one embodiment, the alkyl group has greater than about 11, 12 or 13 carbon atoms. In another embodiment, the alkyl group has greater than about 14 or 16 carbon atoms.

In one embodiment, the alkylamido group has formula (II):

wherein $R_7$ is a linear or branched alkyl group having greater than about 10 carbon atoms, wherein n is an integer from 2 to 5. In one embodiment, "n" is an integer of 3, and in another embodiment "n" is an integer of 4.

In one embodiment, the foam stabilizer is of formula (III)

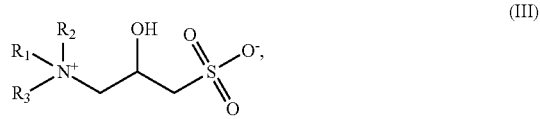

wherein $R_1$ is an alkylamido group or a linear or branched alkyl group; $R_2$ and $R_3$ are individually hydrogen or a methyl group; wherein the alkyl group has greater than about 12 carbon atoms. The gas is chosen from carbon dioxide, air, nitrogen, steam, flue gas or any combination thereof. In some embodiments, introducing the foaming composition into an oil bearing formation means that some of the foaming composition is introduced or placed into one or more high permeability zones located within the oil bearing formation. In one embodiment, the step of introducing the gas into an oil bearing formation includes diverting or flowing the gas into one or more low permeability zones located within the oil bearing formation, as the foaming composition placed (or introduced) into one or more high permeability zone prevents the gas from entering such zone. This in turn can force the gas into one or more low permeability zones.

In yet another aspect, described herein are methods to enhance foam stability in an aqueous foaming composition, comprising the step of adding to such foaming composition a foam stabilizer of formula (I)

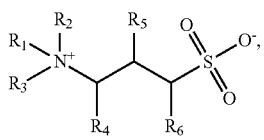

(I)

wherein $R_1$ is an alkylamido group or a branched or linear alkyl group; $R_2$ and $R_3$ are individually hydrogen or a methyl group; $R_4$, $R_5$ and $R_6$ are individually hydrogen or a hydroxy group, with the proviso that at least one of $R_4$, $R_5$ or $R_6$ is a hydroxyl group; wherein the alkyl group has greater than about 10 carbon atoms. The alkylamido group can be of formula (II) (above) wherein $R_7$ is a linear or branched alkyl group having greater than about 10 carbon atoms, wherein "n" is an integer from 2 to 5.

In one embodiment, the foam stabilizer is of formula (III)

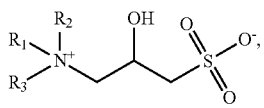

(III)

wherein $R_1$ is an alkylamido group or a linear or branched alkyl group; $R_2$ and $R_3$ are individually hydrogen or a methyl group; wherein the alkyl group has greater than about 12 carbon atoms.

In yet another aspect, described herein are methods to enhance foam stability in aqueous foaming compositions, comprising the step of adding to a foaming composition a foam stabilizer selected from alkyl dimethyl betaine, alkyl amidopropyl hydroxy sulfobetaine, alkyl hydroxy sulfobetaine or any combination thereof, wherein the alkyl group has greater than 10 carbon atoms. The aqueous foaming composition can be part of an oil field treatment fluid.

Described herein are foam stabilizers or surfactants that are found to boost the foam, foam expansion ratio and foam stability, within a wider range of concentrations, as well as impart other benefits to aqueous formulations. Due to much lower molecular weights compared to traditionally-utilized polymers, the surfactants described herein are easily incorporated into foaming solutions. In one embodiment, certain amphoteric/zwitterionic surfactants are compatible with (foaming) anionic surfactants used in most of the formulations used for generating foams.

DETAILED DESCRIPTION OF THE DISCLOSURE

As used herein, the term "alkyl" means a monovalent saturated straight chain or branched hydrocarbon radical, typically a monovalent saturated (C1-C20) hydrocarbon radical, such as for example, methyl, ethyl, n-propyl, iso-propyl, n-butyl, sec-butyl, t-butyl, pentyl, or n-hexyl, which may optionally be substituted on one or more of the carbon atoms of the radical. In one embodiment, an alkyl radical is substituted on one or more carbon atoms of the radical with hydroxy, alkoxy, amino, halo, carboxy, or phosphono, such as, for example, hydroxymethyl hydroxyethyl, methoxymethyl, ethoxymethyl, isopropoxyethyl, aminomethyl, chloromethyl or trichloromethyl, carboxyethyl, or phosphonomethyl. The term "alkyl" can also means an unsaturated straight chain, branched chain, or cyclic hydrocarbon radical that contains one or more carbon-carbon double bonds, such as, for example, ethenyl, 1-propenyl, or 2-propenyl, which may optionally be substituted on one or more of the carbon atoms of the radical.

As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, the term "cylcoalkyl" means a saturated cyclic hydrocarbon radical, typically a (C1-C18) saturated cyclic hydrocarbon radical, such as, for example, cyclohexyl or cyclooctyl, which may optionally be substituted on one or more of the carbon atoms of the radical.

As used herein, the term "aryl" means a monovalent unsaturated hydrocarbon radical containing one or more six-membered carbon rings in which the unsaturation may be represented by three conjugated double bonds, such as for example, phenyl, naphthyl, anthryl, phenanthryl, or biphenyl, which may optionally substituted one or more of carbons of the ring. In one embodiment, an aryl radical is substituted on one or more carbon atoms of the radical with hydroxy, alkyl, halo, haloalkyl, or amino, such as, for example, methylphenyl, dimethylphenyl, hydroxyphenyl, chlorophenyl, trichloromethylphenyl, or aminophenyl.

As used herein, the term "aralkyl" means an alkyl group substituted with one or more aryl groups, such as, for example, phenylmethyl, phenylethyl, or triphenylmethyl, which may optionally be further substituted on one or more of the carbon atoms of the radical.

As used herein, the term "alkaryl" means an aryl group substituted with one or more alkyl groups, such as, for example, methylphenyl, dimethylphenyl, or trimethylphenyl, which may optionally be further substituted on one or more of the carbon atoms of the radical.

As used herein, the indication that a radical may be "optionally substituted" or "optionally further substituted" means, in general, that is unless further limited, either explicitly or by the context of such reference, that such radical may be substituted with one or more inorganic or organic substituent groups, such as, for example, alkyl, aryl, aralkyl, alkaryl, a hetero atom, or heterocyclyl, or with one or more functional groups that are capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

As used herein, the terminology "(Cx-Cy)" in reference to an organic group, wherein x and y are each integers, indicates that the group may contain from x carbon atoms to y carbon atoms per group.

As used herein, the term "mobility control" is to be interpreted in its broadest sense and is also meant to include a process where the sweep efficiency of a reservoir or oil-bearing formation is improved.

In one aspect, described herein are methods to enhance foam, stability in an aqueous foaming composition, comprising the step of adding to the aqueous foaming composition a foam stabilizer. In one aspect, described herein are methods for enhancing recovery of oil from an oil-bearing formation within a reservoir, comprising introducing a foaming composition into an oil-bearing formation; introducing a gas under pressure into the oil-bearing formation; and extracting oil through a wellbore in the reservoir, wherein the foaming composition introduced in the oil-bearing formation affects or diverts the flow of gas to low permeability zones of the oil-bearing formation. In one embodiment, the use of the foaming compositions described herein is used as in mobility control.

In one embodiment, the foaming composition comprises water and a foam stabilizer as described herein. In another embodiment, the foaming composition comprises water and a foaming gas. The foaming gas can be any gas that imparts foaming properties to the foaming composition such as nitrogen, air, carbon dioxide, steam, natural gas or any combination thereof. It is understood that the foaming composition can comprise other components, including for example one or more surfactants. The surfactants are typically one or more non-ionic surfactants, one or more cationic surfactants, one or more amphoteric surfactants, one or more zwitterionic surfactants, one or more anionic surfactants or any combination thereof.

It is also understood that the foaming composition can comprise at least one additional component. The additional component, for example, can supplement or improve the properties of the foaming composition. In some embodiment, the additional component is a foam boosting agent or foam boosting polymer.

In one embodiment, additional components include one or more synthetic polymers, natural polymers or derivatives thereof. The polymer is, in one further embodiment, at least one cationic polymer of cationically-modified polysaccharides, cationizable polysaccharides, and polyvinyl amines and copolymers, for example, vinyl amine/vinyl alcohol copolymers, and vinyl amine/acrylamide copolymers. The cationic polymers have a weight average molecular weight of 35,000 to 10,000,000, more typically in the range of about 200,000 to about 3,000,000 grams/mol.

Suitable cationic polymers include, but are not limited to, synthetic polymers that comprise monomeric units derived from one or more amine- and/or quaternary ammonium-substituted monomers and natural polymers that have been derivatized to include amine- and/or quaternary ammonium-containing pendant groups. Such suitable cationic polymers include, for example: copolymers of 1-vinyl-2-pyrrolidine and 1-vinyl-3-methyl-imidazolium salts (such as Polyquaternium-16), copolymers of 1-vinyl-2-pyrrolidine and dimethylaminoethyl methacrylate (such as Polyquaternium-11), cationic diallyl quaternary ammonium-containing polymers including, for example, dimethyldiallyammonium chloride homopolymers and copolymers of acrylamide and dimethyl-diallylammonium chloride (such as Polyquaternium 6 and Polyquaternium 7), cationic polyacrylamides, cationic polysaccharide polymers, such as, for example, cationic cellulose derivatives, cationic starch derivatives, and cationic guar gum derivatives, such as salts of hydroxyethyl cellulose reacted with trimethyl ammonium substituted epoxide (such as Polyquaternium 10), polymeric quaternary ammonium salts of hydroxyethyl cellulose reacted with lauryl dimethyl ammonium-substituted epoxide (such as Polyquaternium 24) and guar hydroxypropyltrimonium chloride, and cationic protein derivatives, such as cocodimonium hydroxypropyl hydrolyzed wheat protein.

Suitable guar-based cationic polymers include, but are not limited to cationic hydroxpropyl guar, hydroxyalkyl guar, including hydroxyethyl guar (HE guar), hydroxypropyl guar (HP guar), hydroxybutyl guar (HB guar) and higher hydroxylalkyl guars, carboxylalkyl guars, including carboxymethyl guar (CM guar), carboxylpropyl guar (CP guar), carboxybutyl guar (CB guar), and higher alkyl carboxy guars, guar hydroxypropyltrimonium chloride, or hydroxypropyl guar hydroxypropyltrimonium chloride.

In one particular embodiment, the foaming composition is comprised of the foam stabilizer, water and at least one anionic surfactant utilized as a foaming agent. In one embodiment, the anionic surfactant is an alkyl olefin sulfonate. In another particular embodiment, the foaming composition is comprised of the foam stabilizer, water, at least one anionic surfactant utilized as a foaming agent, and at least one cationic polymer utilized as a foam boosting agent.

In one embodiment, the foaming composition can be or be part of any industrial or commercially utilized foam including but is not limited to fire fighting foams, foam cleaners, industrial foams, agricultural foams, foams used in home and personal care products.

In another aspect, described herein are methods to enhance the recovery of oil from an oil-bearing formation by utilizing a foam stabilizer. In one embodiment, the foam stabilizer described herein increases foam stability of an oil well treatment fluid. In another embodiment, the foam stabilizer described herein increases foam stability of a foaming composition, which foaming composition can be utilized as part of an oil well treatment fluid. The foaming composition can also be utilized in conjunction with an oil well treatment fluid in a multi-step process to recover oil from a formation.

The foam stabilizer can be part of a package (e.g., surfactant package) introduced into the formation by itself or with another fluid or fluid composition, for example, the foaming composition or the oil well treatment fluid.

In one embodiment, described herein are method to enhance the recovery of oil from an oil-bearing formation comprising the step of adding to aqueous foaming composition or oil well treatment fluid (or both) a foam stabilizer. In one embodiment, the foam stabilizer is of formula (I):

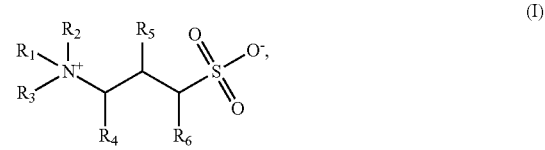

$R_1$ can be an alkylamido group in one embodiment. In another embodiment, $R_1$ comprises a branched or linear alkyl group. Typically, the branched or linear alkyl group is a carbon group of greater than about 8, more typically greater than about 10, even more typically greater than 12, and more typically greater than 16. In other embodiments, the branched or linear alkyl group is a carbon group of greater than 13 or greater than 14.

In one embodiment, the linear or branched alkyl group is a $C_{10}$-$C_{24}$ alkyl group, in another embodiment, a $C_{12}$-$C_{22}$ alkyl group, in yet another embodiment, a $C_{14}$-$C_{22}$ alkyl group, and in yet another embodiment, a $C_{16}$-$C_{18}$ alkyl group.

$R_2$ and $R_3$ are individually hydrogen, a methyl group or hydroxyethyl group. In one embodiment, $R_2$ and $R_3$ are both methyl groups.

$R_4$, $R_5$ and $R_6$ are individually hydrogen or a hydroxy group, with the proviso that at least one of $R_4$, $R_5$ or $R_6$ is a hydroxyl group. In one particular embodiment, $R_5$ is a hydroxyl group, and $R_4$ and $R_6$ are both hydrogen. In such particular embodiment, the structure has formula (III):

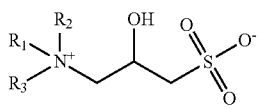

(III)

wherein $R_1$, $R_2$ and $R_3$, are the same as stated above.

In one embodiment, the alkylamido group has formula (II):

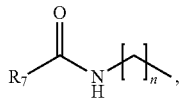

(II)

wherein $R_7$ is a linear or branched alkyl group having greater than about 10 carbon atoms. The branched or linear alkyl group can have a carbon group greater than about 12, or in another embodiment a carbon group of greater than about 13, or greater than 14, or greater than 15. In other embodiments, the branched or linear alkyl group is a carbon group of greater than 16 or greater than 20. In one embodiment, the linear or branched alkyl group is a $C_{10}$-$C_{24}$ alkyl group, in another embodiment, a $C_{12}$-$C_{22}$ alkyl group, in yet another embodiment, a $C_{14}$-$C_{22}$ alkyl group, and in yet another embodiment, a $C_{16}$-$C_{18}$ alkyl group.

"n" can be any integer from between about 1 and 15, more typically an integer from between about 2 to about 10. In one embodiment, "n" is an integer of from between 3 to about 5. In another embodiment "n" is an integer of from between about 2 and about 4. In one embodiment, "n" is an integer of 3, and in another embodiment "n" is an integer of 4.

In one embodiment, the treatment fluid is a foaming composition, wherein the foaming composition can comprise a foaming component, water and a foam stabilizer described herein. In another embodiment, the foaming composition comprises a foaming component and water, wherein the foaming component is the foam stabilizer described herein. In yet another embodiment, the foaming composition comprises a foam stabilizer, one or more surfactants used as foaming agents, optionally, a gas, optionally, one or more surfactants, and optionally, water.

In one method of the present disclosure, a foaming composition having a component part of one or more foam stabilizers described herein is introduced, e.g., injected, into a reservoir or formation at elevated pressure for the purpose of pushing or expelling oil from it. The foaming composition, which assumes a foam-like form or consistency, enters and settles within the large fractures within the formation (i.e., high permeability zones) and substantially diverts one or more gasses, or a gas/surfactant mixture or a gas/aqueous fluid mixture in to the less permeable oil bearing matrix (i.e., low permeability zones). This, in turn, can mobilize the trapped oil and/or gas from the matrix through the fracture network. Essentially, the foaming composition acts as a barrier to entry in the fracture network. When the fracture network is effectively or substantially plugged, the gas permeates into the porous matrix of the formation instead of the fracture network. The gas pushes the oil entrapped in the matrix into the fracture network, where it can be easily recovered by conventional means.

In one embodiment, aside from the one or more foam stabilizers or one or more foaming agents, other surfactants or polymers can be present in the foaming composition described herein. Surfactants can act to lower the IFT between the treatment fluid and oil entrapped in the matrix of the formation and/or increase the viscosity of the injected water during treatment.

In some embodiments, the gas used in the gas flooding operation described herein is a gas or a combination of gas and aqueous fluids. The fluid can be in a supercritical state. The gas or gas/fluid mixture can be injected as a slug or in a continuous injection. In some embodiments, a gas injection is employed in conjunction with a water injection in a water-alternating-gas (WAG) process.

As used herein, the term "reservoir" is inclusive of the term "oil-bearing formation" (including but not limited to a carbonate oil-bearing formation) as such a formation is typically located within a reservoir. One or more wellbores may be located in the vicinity of the reservoir and/or formation for the purpose of extracting oil. The treatment fluid may be introduced through a wellbore or other protrusion, drill hole, or opening into the reservoir. The treatment fluid will be introduced at an elevated pressure sufficient to ensure substantial infiltration of the treatment fluid into the fracture network of the formation and substantial exposure of the porous matrix of such formation. Oil may be extracted at the same or a different location than the location of the point of introduction of the treatment fluid.

In some embodiments, surfactants are present in the treatment fluid at an amount sufficient to provide the treatment fluid (prior to injection into the formation or reservoir) with an interfacial surface tension (IFT) with crude oil of about 10 mNm or less, preferably about 1 mNm or less, and most preferably about 0.1 or less. The surfactants are preferably present in the treatment fluid at an amount about 0.1 to about 10 wt % and most preferably about 0.5 to about 6 wt % based on the total weight of the treatment fluid. The amount of surfactant necessary will vary considerably depending on factors, including surfactant type, brine content in the fluid, and impurities in the treatment fluid. The surfactants are effective in providing the desired levels of IFT even in treatment fluids having high salinity, i.e. up to about 20 lbs/1 gallon concentration. Salts may be organic or inorganic salts, including monovalent, divalent, and trivalent species. Inorganic salts commonly encountered in brackish and salt water include, but are not limited to, chloride and bromide salts of potassium, sodium, calcium, magnesium, zinc, iron, and ammonium.

Useful foaming agents can include but are not limited to nonionic surfactants, cationic surfactants, amphoteric surfactants, zwitterionic surfactants, and anionic surfactants. Nonionic surfactants do not contain a charged moiety. Amphoteric surfactants have both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic). Zwitterionic surfactants have a permanently positively charged moiety in the molecule regardless of pH and a negatively charged moiety at alkaline pH. Cationic surfactants have a permanently positively charged moeity in the molecule regardless of pH. Anionic surfactants have a permanently negatively charged moiety except at very acidic pH. It is understood, however, that any surfactant or composition that can form a moderate to strong foam is useful in the compositions and methods described herein.

In one embodiment, the foaming agent should be present in the foaming compositions described herein in an amount sufficient to provide a suitable foam. In some embodiments, the foaming agent is present in an amount in the range of from about 0.1% and about 15% by volume of the water present in the foaming composition. In other embodiments, the foaming agent is present in an amount in the range of from about 0.5% and about 5% by volume of the water present in the foaming composition.

Nonionic Surfactants

In some embodiments, useful nonionic surfactants include but are not limited to fatty acid esters, glycerol esters, ethoxylated fatty acids esters of glycol, ethoxylated fatty acid esters of polyethylene glycol, amines, sorbitan esters, alkoxylates of secondary alcohols, alkylphenol alkoxylates. Typical nonionic surfactants are glycerol esters, ethoxylated fatty acids esters of glycol and ethoxylated fatty acid esters of polyethylene glycol.

Selected nonionic surfactants have the structures:

$R_3C(O)O-(CH_2CH_2O)_p-R_4$; and $R_3C(O)OCH_2CH(OH)CH_2O-R_4$ and combinations thereof.

$R_3$ is hydrocarbon chain containing about 10 to about 22 carbon atoms and may be branched or straight chained and saturated or unsaturated; $R_4$ hydrogen or a hydrocarbon chain containing about 1 to about 20 carbon atoms and may be branched or straight chained and saturated or unsaturated; "p" is from about 1 to about 20, preferably from about 5 to about 20, more preferably from about 5 to about 12.

Amines have the following structural formula:

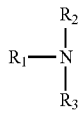

wherein $R_1$ is a hydrophobic moiety of alkyl, alkylarylalkyl, alkoxyalkyl, alkylaminoalkyl or alkylamidoalkyl, and wherein $R_1$ has from about 10 to about 22 carbon atoms and may be branched or straight-chained and saturated or unsaturated.

$R_2$ and $R_3$ are, independently, i) an aliphatic group or ii) an aliphatic group with an aromatic or benzylic moiety bonded therewith. $R_2$ and $R_3$, have from 1 to about 20 atoms. The aliphatic group can be branched or straight-chained and saturated or unsaturated. $R_2$ and $R_3$, can independently be, for example, alkyl, oxyalkyl, polyoxyalkyl, alkoxy, and alkylaryl. Typically, $R_2$ and $R_3$ are alkyl groups. Most typically, $R_2$ and $R_3$ are, independently, methyl or ethyl groups.

Representative amines of the above structure include polyoxyethylenated (2-15) cocoalkylamines, polyoxyethylenated (12-18) tallow alkylamines, and polyoxyethylenated (2-15) oleyl and erucyl amines.

Cationic Surfactants

In some embodiments, useful cationic surfactants include but are not limited to i) quaternary salts and ii) amine oxides, iii) and combinations thereof.

Some representative cationic surfactants are set forth below.

Quaternary salts having the structural formula:

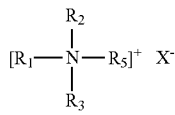

wherein $R_1$ is a hydrophobic moiety of alkyl, alkylarylalkyl, alkoxyalkyl, alkylaminoalkyl or alkylamidoalkyl, and wherein $R_1$ has from about 10 to about 22 carbon atoms and may be branched or straight-chained and saturated or unsaturated.

$R_2$ and $R_3$ are, independently, i) an aliphatic group or ii) an aliphatic group with an aromatic or benzylic moiety bonded therewith. $R_2$, $R_3$, and $R_5$ have from 1 to about 20 atoms. The aliphatic group can be branched or straight-chained and saturated or unsaturated. $R_2$, $R_3$, and $R_5$ can be, for example, alkyl, oxyalkyl, polyoxyalkyl, alkoxy, and alkylaryl. Preferably, $R_2$, $R_3$, and $R_5$ are alkyl groups. Most preferably, $R_2$, $R_3$, and $R_5$ are methyl or ethyl groups.

X is suitable counter-anion, such as $Cl^-$, $Br^-$, and $CH_3CH_3SO_4^-$.

Anionic Surfactants

In some embodiments, useful anionic surfactants include but are not limited to dodecylbenzenesulfonates, alpha olefin sulfonates, internal olefin sulfonates, diphenyloxide disulfonates, alkyl naphthalene sulfonates, alkyl sulfates, sulfates, sulfosuccinates, sulfosuccinamates, naphthalene-formaldehyde condensates, alkyl sulfoesters and alkyl sulfoamides and mixtures thereof. Some non-limiting examples include, alfa olefin sulfonates, alkyltoluene sulfonates, alkylxylene sulfonates, alpha olefin sulfonate dimers, hydroxyl sulfonates, alkene sulfonates, internal olefin sulfonates.

Representative anionic surfactants include those of the following structural formulas:

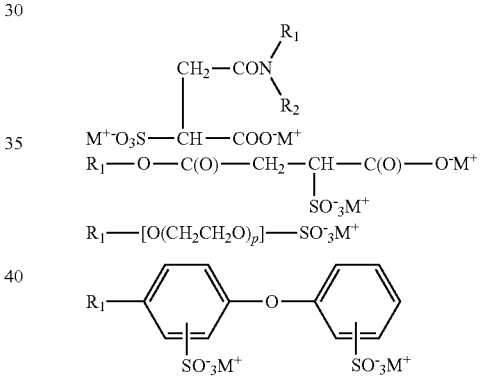

and combinations thereof.

$R_1$ is selected from a group consisting of alkyl, aryl, alkaryl, alkylarylalkyl, arylalkyl, alkylamidoalkyl and alkylaminoalkyl; wherein the alkyl group has about 10 to about 18 carbon atoms; wherein the aryl group represents a phenyl, diphenyl, diphenylether, or naphthalene moiety.

$R_2$ is selected from a group consisting of hydrogen, —$CH_2CH_2OH$, alkyl, aryl, alkaryl, alkylarylalkyl, arylalkyl, alkylamidoalkyl and alkylaminoalkyl; wherein the alkyl group has about 10 to about 18 carbon atoms; wherein the aryl group represents a phenyl, diphenyl, diphenylether, or naphthalene moiety.

"p" is 0 to about 10, preferably 0 to about 5.

M is hydrogen, an alkali metal such as sodium or potassium, or an ammonium salt. M is preferably an alkali metal such as sodium or potassium, more preferably sodium.

In other embodiments, useful anionic surfactants include but are not limited to compounds according to the following structural formulas, as well as mixtures thereof:

$ROSO_3^-$ $R((OCH_2CH_2)_m(OCH_2CHCH_3)_n)_pOSO_3^-$ $RSO_3^-$ $R((OCH_2CH_2)_m(OCH_2CHCH_3)_{n'})_p OCH_2CH(OH)CH_2SO_3^-$ $RC_6H_4-SO_3^-$ wherein R represents an alkyl, arylalkyl, or hydroxyalkyl group, each m, n, m', and n' is independently an integer of from 0 to about 50 and p and p' are each integers of from 1 to about 25. R has about 10 to about 24 carbon atoms and more preferably about 12 to about 20 carbon atoms. R may be saturated or unsaturated, branched or straight chained, wherein branch alkyl groups have from 1 to about 6 carbon atoms. Representative alkyl groups for R include decyl, dodecyl, tetradecyl (myristyl), hexadecyl (cetyl), octadecyl (oleyl), stearyl, erucyl, and the derivatives of coco, tallow, soy, and rapeseed oils.

In one embodiment of the compound according to formula (II), m and n are each 0. In another embodiment of the compound according to formula (II), one of m and n is 0 and the other is non-zero. In another embodiment of the compound according to formula (II), m and n are each non-zero. In one embodiment of the compound according to formula (IV), m' and n' are each 0. In another embodiment of the compound according to formula (IV), one of m' and n' is 0 and the other is non-zero. In another embodiment of the compound according to formula (IV), m' and n' are each non-zero.

If both types of alkyleneoxy units are present in the compounds according to structures (II) or (IV), that is, if m and n of the compound according to structure (II) are each non-zero, or if m' and n' of the compound according to structure (IV) are each non-zero, then such alkyleneoxy groups may be in arranged in alternating, random, or block order.

In one embodiment, the total number of alkyleneoxy groups per molecule, that is, in the case of the compound according to formula (II), the sum of the number of alkyleneoxy groups, (m+n), for the number of units, p, of such alkyleneoxy groups, and in the case of the compound according to formula (IV), the sum the number of alkyleneoxy groups, (m'+n'), for the number of units, p', of such alkyleneoxy groups, ranges from 0 to about 35 and more preferably 0 to about 10.

Zwitterionic Surfactants

In some embodiments, useful zwitterionic surfactants include but are not limited to compounds having the formula:

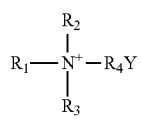

wherein $R_1$ represents a hydrophobic moiety of alkyl, alkylarylalkyl, alkoxyalkyl, alkylaminoalkyl and alkylamidoalkyl, wherein alkyl represents a group that contains from about 10 to about 24 carbon atoms which may be branched or straight chained and which may be saturated or unsaturated. Representative long-chain alkyl groups include tetradecyl (myristyl), hexadecyl (cetyl), octadecenyl (oleyl), octadecyl (stearyl), docosenoic (erucyl) and the derivatives of tallow, coco, soya and rapeseed oils. The typical alkyl groups have from about 16 to about 22 carbon atoms. Representative of alkylamidoalkyl is alkylamidopropyl with alkyl being as described above.

$R_2$ and $R_3$ are independently an aliphatic chain (i.e. as opposed to aromatic at the atom bonded to the quaternary nitrogen, e.g., alkyl, arylalkyl, hydroxyalkyl, carboxyalkyl, and hydroxyalkyl-polyoxyalkylene, e.g. hydroxyethyl-polyoxyethylene or hydroxypropyl-polyoxypropylene) having from 1 to about 50 carbon atoms, in other embodiments from about 1 to about 20 carbon atoms, in other embodiments from about 1 to about 10 carbon atoms and in yet other embodiments from about 1 to about 6 carbon atoms in which the aliphatic group can be branched or straight chained, saturated or unsaturated. Exemplary alkyl chains are methyl, ethyl, preferred arylalkyl is benzyl, and preferred hydroxyalkyls are hydroxyethyl or hydroxypropyl, while preferred carboxyalkyls are acetate and propionate. Exemplary hydroxyalkyl-polyoxyalkylenes are hydroxyethyl-polyoxyethylene and hydroxypropyl-polyoxyethylene.

$R_4$ is a hydrocarbyl radical (e.g. alkylene) with chain length 1 to 4. In one embodiment, $R_4$ is a methylene or ethylene group.

Y is $COO^-$ or $CH(OH)CH_2SO_3^-$ or $SO_3^-$

Specific examples of suitable zwitterionic surfactants include the following structures:

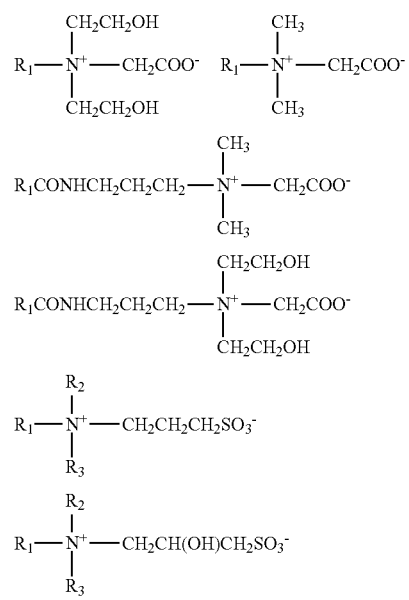

wherein $R_1$, $R_2$, $R_3$ has been previously defined herein.

Another example of a suitable zwitterionic surfactant selected is an amine oxide. This material has the following structure:

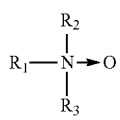

wherein $R_1$, $R_2$, and $R_3$ are as defined above.

Other representative zwitterionic surfactants include dihydroxyethyl tallow glycinate, propionates, oleamidopropyl betaine, and erucyl amidopropyl betaine.

Amphoteric Surfactants

Examples of amphoteric surfactants include but are not limited to those represented by the following formula:

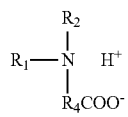

wherein $R_1$, $R_2$, and $R_4$ are the same as defined above.

Other specific examples of amphoteric surfactants include the following structures:

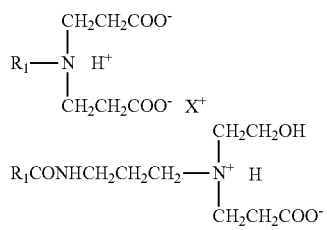

wherein R1 has been previously defined herein, and X+ is an inorganic cation such as Na+, K+, NH4+ associated with a carboxylate group or hydrogen atom in an acidic medium.

Useful zwitterionic and amphoteric surfactants include those disclosed in U.S. Pat. No. 6,831,108 B2 and U.S. Pat. No. 7,461,694 B2, which are incorporated herein by reference.

The treatment fluid optionally has one or more members from the group of organic acids, organic acid salts, and inorganic acids, and inorganic salts. The organic acid or salt thereof aids in the development of increased viscosity. Since brackish water is frequently used as a treatment fluid in the oilfield, salt content at some level may already present.

Useful organic acids are typically those of a sulfonic acid or a carboxylic acid. Anionic counter-ions of the organic acid salts are typically sulfonates or carboxylates. Representative of such organic molecules include aromatic sulfonates and carboxylates such as p-toluene sulfonate, naphthalene sulfonate, chlorobenzoic acid, salicylic acid, phthalic acid and the like, wherein such counter-ions are water-soluble. Most preferred are salicylate, phthalate, p-toluene sulfonate, hydroxynaphthalene carboxylates, e.g. 5-hydroxy-1-napthoic acid, 6-hydroxy-1-napthoic acid, 7-hydroxy-1-napthoic acid, 1-hydroxy-2-naphthoic acid, preferably 3-hydroxy-2-naphthoic acid, 5-hydroxy-2-naphthoic acid, 7-hydroxy-2-napthoic acid, and 1,3-dihydroxy-2-naphthoic acid and 3,4-dichlorobenzoate. The organic acid or salt thereof will optionally be present in the treatment fluid at from about 0.1 wt % to about 10 wt %, more typically from about 0.1 wt % to about 7 wt %, and even more typically from about 0.1 wt % to about 6 wt % based on the total weight of the treatment fluid.

Useful inorganic acids and salts include water-soluble potassium, sodium, and ammonium salts, such as potassium chloride and ammonium chloride. Additionally, calcium chloride, calcium bromide and zinc halide salts may also be used. The inorganic salt is optionally present in the treatment fluid at a weight concentration of from about 0.1 wt % to about 30 wt %, more typically from about 0.1 wt % to about 10 wt %, and even more typically from about 0.1 wt % to about 8 wt %. Organic salts, e.g. trimethylammonium hydrochloride and tetramethylammonium chloride, may also be used in addition to, or as a replacement for, the inorganic salts.

One component of the treatment fluid is water. In one embodiment, water will be a major amount by weight of the fluid. In other embodiments, however, water will not be the major component by weight of the fluid. The water can be from any source so long as the source contains no contaminants that are chemically or physically incompatible with the other components of the fluid (e.g., by causing undesirable precipitation). The water need not be potable and may be brackish and contain salts of such metals as sodium, potassium, calcium, zinc, magnesium, etc or other materials typical of sources of water found in or near oil fields.

Optionally, natural or synthetic polymers may be added to the treatment fluid to further regulate viscosity. Useful polymers include, but are not limited to, guar and guar derivatives, xanthan, polyacrylamide (PAM), starch and starch derivatives, cellulosic derivatives, and polyacrylates.

The treatment fluid may contain a gas such as air, nitrogen, natural gas and carbon dioxide to provide an energized fluid or foam. Supercritical carbon dioxide can be also present.

Optionally, other surfactants, polymeric or nonpolymeric, can be added to the treatment fluid to impart additional IFT reduction and/or modify viscosity. Such other surfactants may impact IFT and/or viscosity. Other useful surfactants can be anionic, cationic, nonionic, zwitterionic/amphoterics and combinations thereof. When present, the other surfactants will preferably be present in limited amounts, i.e., about 0.5% or less, more preferably about 0.2% or less, and even more preferably 0.1% or less by weight based on the total weight of the treatment fluid.

The treatment fluid affords the advantage of substantial reducing or preventing infiltration of gas from adjacent gas-bearing formations into the fracture network of the oil-bearing formation and reservoir. The reduction or prevention of gas infiltration enables the internal pressure and the formation and reservoir to be substantially maintained. The maintenance of internal pressure prevents migration or pushing down of oil within the oil-bearing formations to be minimized or prevented making the oil easier to recover.

EXAMPLES

Example 1

In the following example, stability of the foam obtained with the foam stabilizer described herein, which in one embodiment is alkyl amido propyl sulfobetaines (also denoted as sultaines) is measured. The foam stability of the formulations described herein is compared with that of the formulations as described in WO2010/068082.

Testing is carried out at 25° C. and atmospheric pressure according to the following protocol:

7 mL of aqueous surfactant formulation is placed at the bottom of a 30 mL volume Allihn filter tube. This system consists in a about 30 mL straight tube (2 cm diameter, 10 cm height) with a frit of characteristic pore size ranging from 10 to 16 μm fitted at the bottom of the tube (VWR international).

Nitrogen gas is injected at 50 mL/min flow rate during 30 seconds at the bottom of the filter tube through the frit in the aqueous formulation. A foam can form that initially totally fills the tube.

Height of the foam is recorded as a function of time using a CCD camera.

A first, quick decrease of foam height is observed within the first ten minutes of the experiment and is linked to gravity drainage through foam lamellae. According to the experimental protocol described in [Georgieva et al, Soft Matter, 5, 2063, 2009], the initial foam height ho is chosen as the foam height after this first gravity drainage phase (10 minutes after the beginning of the experiment).

Foam height h is then measured every minute after the gravity drainage phase and compared to the initial foam height ho.

Surfactants used are listed below:

Cocamido propyl betaine: Mirataine BET C30 manufactured by Rhodia.

$C_{12}$ alfa olefin sulfonate: Calsoft AOS 1245 manufactured by Pilot

Cocamido propyl hydroxy sultaine: Mirataine CBS manufactured by Rhodia $C_{22}$ amido propyl hydroxy sultaine Lauryl trimethyl ammonium chloride: Arquad 1237 manufactured by Akzo.

All formulations are tested at 0.66% wt. total surfactant in deionized water and include (expressed for a 100% surfactant formulation):

Formulation 1: 50% wt. cocamido propyl betaine, 50% wt. $C_{12}$ alpha olefin sulfonate.

Formulation 2: 50% wt. cocamido propyl hydroxy sultaine, 50% wt. $C_{12}$ alpha olefin sulfonate Formulation 3: 50% wt. $C_{22}$ amido propyl hydroxy sultaine, 50% wt. $C_{12}$ alpha olefin sulfonate Formulation 4: 50.3% wt. cocamido propyl betaine, 45.7% wt. $C_{12}$ alpha olefin sulfonate, 4% lauryl trimethyl ammonium chloride.

Formulation 5: 50.3% wt. cocamido propyl hydroxy sultaine, 45.7% wt. $C_{12}$ alpha olefin sulfonate, 4% lauryl trimethyl ammonium chloride.

Formulation 6: 50.3% wt. $C_{22}$ amido propyl hydroxy sultaine, 45.7% wt. $C_{12}$ alpha olefin sulfonate, 4% lauryl trimethyl ammonium chloride.

Formulations 1 and 4 serve as a reference to illustrate a foaming composition utilizing the foam stabilizer described herein. Results, expressed in percentage of the initial foam height as a function of time (h(t)/ho) after 1, 2, 3 and 4 hours are reported in table 1.

Results show an increase in foam stability when the cationic compound trimethyl lauryl ammonium chloride is added to a mix of cocamido propyl amphoterics and a $C_{12}$ alfa olefin sulfonate. The results also show that within experimental error, cocamido propyl hydroxy sultaines provide a foam stability comparable to that obtained with cocamido propyl betaines. The same trend is observed with $C_{22}$ amido propyl hydroxy sultaines that provide foam stability comparable to, and even slightly higher than $C_{12}$ cocamido propyl betaines. Therefore, while providing technical advantages such as lower adsorption (possibly) on reservoir rock and improved thermal stability compared to betaines, sultaines prove to be as efficient at stabilizing foam when used in formulations as described in WO 2010/068082.

TABLE 1 foam height as a function of time for selected formulations.

| Formulation number | Composition | h(t)/ho | | | |
|---|---|---|---|---|---|
| | | t = 1 hour | t = 2 hour | t = 3 hour | t = 4 hour |
| 1 | 50% cocamido propyl betaine, 50% $C_{12}$ alfa olefin sulfonate | 100% | 88% | 83% | 79% |
| 2 | 50% cocamido propyl hydroxy sultaine, 50% $C_{12}$ alfa olefin sulfonate. | 100% | 100% | 94% | 79% |
| 3 | 50% $C_{22}$ amido propyl hydroxy sultaine, 50% $C_{12}$ alfa olefin sulfonate | 100% | 90% | 86% | 85% |
| 4 | 50.3% cocamido propyl betaine, 45.7% $C_{12}$ alfa olefin sulfonate, 0.4% lauryl trimethyl ammonium chloride | 100% | 94% | 88% | 87% |
| 5 | 50.3% cocamido propyl hydroxy sultaine, 45.7% $C_{12}$ alfa olefin sulfonate, 0.4% lauryl trimethyl ammonium chloride | 100% | 100% | 92% | 90% |
| 6 | 50.3% $C_{22}$ amido propyl hydroxy sultaine, 45.7% $C_{12}$ alfa olefin sulfonate, 0.4% lauryl trimethyl ammonium chloride | 100% | 100% | 93% | 89% |

Example 2

Improved stability of sultaines based foams in presence of dodecane (or an alkane hydrocarbon).

Stability of foam in the presence of oil is characterized according to the following protocol:

8 mL of foam is generated by bubbling 7 mL of gas in 2 mL of formulation in a 8 mL vial using a pipette tip 200 µL of dodecane is added on top of foam column After gravity drainage, as described in example 1, foam height h is measured as a function of time and compared to initial foam height after gravity drainage ho.

Surfactants used are listed below:

C14-16 alfa olefin sulfonate (AOS): Rhodacal A246L manufactured by Rhodia

Cocamidopropyl hydroxy sultaine: Mackam CBS manufactured by Rhodia

Cocamidopropyl betaine: Mackam 35 manufactured by Rhodia Two formulations are compared:

Formulation 1: 50% wt. cocamido propyl hydroxy sultaine, 50% wt. C14-16 alfa olefin sulfonate.

Formulation 2: 50% wt. cocamidopropyl betaine, 50% wt. C14-16 alfa olefin sulfonate.

Both formulations are at 0.5% wt. total surfactant in sea water (27.4 g/L NaCl, 10.79 g/L MgCl2, 1.52 g/L CaCl2, 0.77 g/L KCl).

Results, expressed as the relative foam height as a function of time are presented in table 2.

TABLE 2 foam height as a function of time for selected formulations in presence of oil.

| Formulation | | h(t)/ho | | | |
|---|---|---|---|---|---|
| | | t = 1 hour | t = 2 hours | t = 3 hours | t = 4 hours |
| 1 | Cocamidopropyl hydroxy sultaine + AOS1416 | 100% | 100% | 100% | 100% |

TABLE 2-continued foam height as a function of time for selected
formulations in presence of oil.

| Formu-lation | | h(t)/ho | | | |
|---|---|---|---|---|---|
| | | t = 1 hour | t = 2 hours | t = 3 hours | t = 4 hours |
| 2 | Cocamidopropyl betaine + AOS1416 | 60% | 40% | 35% | 30% |

These results demonstrate improved stability of foams in presence of oil when formulated using cocamidopropyl hydroxy sultaines rather than cocamidopropyl betaines.

Example 3

Improved Stability of Sultaines Based Foams at High Temperatures

Stability of foam at 100° C. is characterized according to the following protocol:
8 mL of foam is generated by shaking 2 mL of formulation heated at 100° C. in a closed 8 mL vial
After gravity drainage, as described in example 1, foam height h is measured as a function of time and compared to initial foam height after gravity drainage ho.
Surfactants used are listed below:
C14-16 alfa olefin sulfonate (AOS): Rhodacal A246L manufactured by Rhodia
Cocamidopropyl hydroxy sultaine: Mackam CBS manufactured by Rhodia
Cocamidopropyl betaine: Mackam 35 manufactured by Rhodia
Two formulations are compared:
Formulation 1: 50% wt. cocamido propyl hydroxy sultaine, 50% wt. C14-16 alfa olefin sulfonate.
Formulation 2: 50% wt. cocamidopropyl betaine, 50% wt. C14-16 alfa olefin sulfonate.
Both formulations are at 0.5% wt. total surfactant in sea water (27.4 g/L NaCl, 10.79 g/L MgCl2, 1.52 g/L CaCl2, 0.77 g/L KCl).
Results, expressed as the relative foam height as a function of time are presented in table 3.

TABLE 3 relative foam height as a function of time for selected formulations.

| Formu-lation | | h(t)/ho | | | |
|---|---|---|---|---|---|
| | | t = 1 hour | t = 2 hours | t = 3 hours | t = 4 hours |
| 1 | Cocamidopropyl hydroxy sultaine + AOS1416 | 50% | 30% | 10% | 0% |
| 2 | Cocamidopropyl betaine + AOS1416 | 30% | 15% | 0% | 0% |

These results demonstrate improved stability of foams at high temperature when formulated using cocamidopropyl hydroxy sultaines rather than cocamidopropyl betaines.

It should be understood that the foregoing description is only illustrative of the present disclosure. Various alternatives and modifications can be devised without departing from the disclosure. Accordingly, the present disclosure is intended to embrace all such alternatives, modifications and variances that fall within the scope of the appended claims.

What is claimed is:
1. A method for enhancing recovery of oil from an oil-bearing formation within a reservoir, comprising:
   (a) introducing a foaming composition comprising an alpha olefin sulfonate under pressure into the oil-bearing formation;
   (b) introducing a gas under pressure into the oil-bearing formation, wherein the presence of the foaming composition affects the flow of gas within the oil-bearing formation; and
   (c) extracting oil through a wellbore in the reservoir, wherein the foaming composition comprises a foam stabilizer chosen from alkyl amidopropyl hydroxy sulfobetaine or alkyl hydroxy sulfobetaine, wherein the alkyl group is an integer from between about 10 carbon atoms to about 24 carbon atoms.
2. The method of claim 1 wherein the alkyl group is an integer from between about 12 carbon atoms to about 24 carbon atoms.
3. The method of claim 1 wherein the alkyl group is an integer from between about 18 carbon atoms to about 24 carbon atoms.
4. The method of claim 1 wherein the foaming composition further comprises water and, optionally, a foaming gas.
5. The method of claim 1 wherein the gas comprises carbon dioxide, air, nitrogen, natural gas, steam, flue gas or any combination thereof.
6. The method of claim 1 wherein the step of introducing the foaming composition into an oil bearing formation includes introducing the foaming composition into one or more fracture networks located within the oil bearing formation.
7. The method of claim 1 wherein the step of introducing the gas into an oil bearing formation includes introducing the gas into one or more matrix portions located within the oil bearing formation.
8. The method of claim 1 wherein the foaming composition further comprises a cationic polymer.
9. The method of claim 1, wherein the foaming composition further comprises a cationic polymer selected from the group consisting of galactomannan gums and their derivatives, glucomannan gums and their derivatives, guar gum, locust bean gum, cara gum, hydroxyethyl guar, hydroxypropyl guar, cationically modified cellulose, hydroxypropyl cellulose, hydroxymethyl cellulose, hydroxyethyl cellulose, acrylamide, polyvinyl alcohol, a copolymer of acrylamide, and combinations thereof, having a quaternized amine functionality.
10. The method of claim 1 wherein the foaming composition further comprises a synthetic polymer comprising copolymers of 1-vinyl-2-pyrrolidine and salts thereof, copolymers of 1-vinyl-3-methyl-imidazolium salts, copolymers of 1-vinyl-2-pyrrolidine, copolymers of dimethylaminoethyl methacrylate, dimethyldiallyammonium chloride polymers, copolymers of acrylamide, copolymers of dimethyldiallylammonium chloride, cationic polyacrylamides.
11. A method for enhancing recovery of oil from an oil-bearing formation within a reservoir, comprising:
   (a) introducing a foaming composition comprising an alpha olefin sulfonate under pressure into the oil-bearing formation;
   (b) introducing a gas under pressure into the oil-bearing formation, wherein the presence of the foaming composition affects the flow of gas within the oil-bearing formation; and
   (c) extracting oil through a wellbore in the reservoir, wherein the foaming composition comprises a foam stabilizer having formula (I):

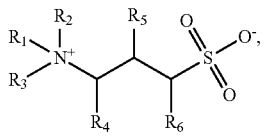
(I)

wherein R1 is an alkylamido group or a linear or branched alkyl group; R2 and R3 are individually hydrogen, a methyl group or a hydroxyethyl group; R4, R5 and R6 are individually hydrogen or a hydroxy group, with the proviso that at least one of R4, R5 or R6 is a hydroxyl group, wherein the alkyl group is an integer from between about 10 carbon atoms to about 24 carbon atoms.

12. The method of claim 11 wherein the alkyl group is an integer from between about 12 carbon atoms to about 24 carbon atoms.

13. The method of claim 11 wherein the alkyl group is an integer from between about 18 carbon atoms to about 24 carbon atoms.

14. The method of claim 11 wherein R1 is the alkylamido group, the alkylamido group having formula (II):

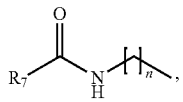
(II)

wherein R7 is a linear or branched alkyl group having greater than about 15 carbon atoms, wherein n is an integer from 2 to 5.

15. The method of claim 14 wherein R7 is a linear or branched alkyl group having greater than about 16 carbon atoms.

16. The method of claim 11 wherein the foam stabilizer is of formula (III)

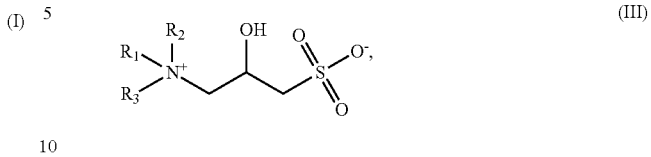
(III)

wherein R1 is an alkylamido group or a linear or branched alkyl group; R2 and R3 are individually hydrogen, a methyl group or a hydroxyethyl group; wherein the alkyl group is an integer from between about 10 carbon atoms to about 24 carbon atoms.

17. The method of claim 11, wherein the foaming composition has up to about 20 lbs/gal water of organic and inorganic salts.

18. The method of claim 11 wherein the step of introducing the foaming composition into an oil bearing formation includes introducing the foaming composition into one or more fracture networks located within the oil bearing formation.

19. The method of claim 11 wherein the step of introducing the gas into an oil bearing formation includes introducing the gas into one or more matrix portions located within the oil bearing formation.

20. The method of claim 11 wherein the foaming composition further comprises a cationic polymer.

21. The method of claim 11, wherein the foaming composition further comprises a cationic polymer selected from the group consisting of galactomannan gums and their derivatives, glucomannan gums and their derivatives, guar gum, locust bean gum, cara gum, hydroxyethyl guar, hydroxypropyl guar, cationically modified cellulose, hydroxypropyl cellulose, hydroxymethyl cellulose, hydroxyethyl cellulose, acrylamide, polyvinyl alcohol, a copolymer of acrylamide, and combinations thereof, having a quaternized amine functionality.

22. The method of claim 11, wherein the foaming composition further comprises a synthetic polymer comprising copolymers of 1-vinyl-2-pyrrolidine and salts thereof, copolymers of 1-vinyl-3-methyl-imidazolium salts, copolymers of 1-vinyl-2-pyrrolidine, copolymers of dimethylaminoethyl methacrylate, dimethyldiallyammonium chloride polymers, copolymers of acrylamide, copolymers of dimethyldiallylammonium chloride, cationic polyacrylamides.

* * * * *